(12) United States Patent
Nachtmann et al.

(10) Patent No.: US 9,644,689 B2
(45) Date of Patent: May 9, 2017

(54) ACTUATING DEVICE FOR A CLUTCH, CLUTCH, ELECTRIC DRIVE MODULE AND METHOD FOR INSTALLING A CLUTCH

(71) Applicant: Schaeffler Technologies AG & Co. KG, Herzogenaurach (DE)

(72) Inventors: Florian Nachtmann, Strassburg (FR); Sebastien Oster, Hoerdt (FR); Willi Ruder, Lahr (DE); Sebastien Heitz, Niederschaeffolsheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 14/437,443

(22) PCT Filed: Dec. 10, 2013

(86) PCT No.: PCT/DE2013/200344
§ 371 (c)(1),
(2) Date: Jul. 23, 2015

(87) PCT Pub. No.: WO2014/090248
PCT Pub. Date: Jun. 19, 2014

(65) Prior Publication Data
US 2015/0337907 A1 Nov. 26, 2015

(30) Foreign Application Priority Data
Dec. 13, 2012 (DE) .................. 10 2012 223 000

(51) Int. Cl.
*F16D 23/12* (2006.01)
*F16D 13/42* (2006.01)
(Continued)

(52) U.S. Cl.
CPC ............. *F16D 23/12* (2013.01); *F16D 13/42* (2013.01); *F16D 23/145* (2013.01); *F16D 28/00* (2013.01);
(Continued)

(58) Field of Classification Search
CPC ....................................................... F16D 13/42
See application file for complete search history.

(56) References Cited

U.S. PATENT DOCUMENTS 4,648,498 A * 3/1987 Herbulot ................. F16D 23/12
192/84.6

FOREIGN PATENT DOCUMENTS

| CN | 86103654 | 11/1986 |
|---|---|---|
| CN | 1103140 | 5/1995 |

(Continued)

*Primary Examiner* — Mark Manley
(74) *Attorney, Agent, or Firm* — Simpson & Simpson, PLLC

(57) ABSTRACT

The present invention relates to an actuating device for a clutch having a stator device, a rotor device which is rotatable in relation to the stator device and a carriage device which is movable to a limited extent in an axial direction in relation to the rotor device and which supplies tensile and thrust forces, which is operatively connected to a push-pull device that is designed to exert tensile and thrust forces on a lever element of the clutch, where the push-pull device has at least one pull element and at least one push element, between which the lever element can be accommodated, and which are connectible to one another, as well as to a clutch having an actuating device, an electric drive module having a clutch, and a method for installing a clutch having an actuating device.

16 Claims, 4 Drawing Sheets

(51) Int. Cl.
  *F16D 23/14*  (2006.01)
  *F16D 28/00*  (2006.01)
(52) U.S. Cl.
  CPC ..... *F16D 2023/123* (2013.01); *Y10S 903/914* (2013.01); *Y10T 29/49947* (2015.01)

(56) References Cited

FOREIGN PATENT DOCUMENTS

| CN | 1404556 | 3/2003 |
|---|---|---|
| DE | 4440532 | 5/1995 |
| DE | 102012207325 | 11/2012 |
| DE | 102011050709 | 12/2012 |
| EP | 1367283 | 12/2003 |
| FR | 2597561 | 10/1987 |
| GB | 1478920 | 7/1977 |

\* cited by examiner

US 9,644,689 B2

ACTUATING DEVICE FOR A CLUTCH, CLUTCH, ELECTRIC DRIVE MODULE AND METHOD FOR INSTALLING A CLUTCH

CROSS-REFERENCE TO RELATED APPLICATIONS

The present application is the U.S. national stage application pursuant to 35 U.S.C. §371 of International Application No. PCT/DE2013/200344, filed on Dec. 10, 2013 which application claims priority from German Patent Application No. DE 10 2012 223 000.9, filed on Dec. 13, 2012, which applications are incorporated herein by reference in their entireties.

TECHNICAL FIELD

The present invention relates generally to an actuating device for a clutch, and, more specifically, to an actuating device for a motor vehicle clutch. Furthermore, the present invention relates to a clutch and to an electric drive module, and, more specifically, to a clutch and an electric drive module for a hybrid vehicle. Furthermore, the present invention relates to a method for installing a clutch having an actuating device, and, more specifically, to a method for installing a clutch having an actuating device that is a disconnect clutch for coupling and uncoupling an internal combustion engine to and from a drivetrain of a hybrid vehicle.

BACKGROUND

From the unpublished German Patent Application DE 10 2011 102 222.1, an actuating device for a clutch is known, having a stator device, a rotor device which is rotatable in relation to the stator device, and a carriage device which is movable to a limited extent in a radial direction in relation to the rotor device and which supplies tensile and thrust forces. Between the rotor device and the carriage device a roller screw drive is provided, having a plurality of coils and a recirculating roller system with rolling elements running in a roller raceway. The roller raceway has a track change region which is designed so that rolling elements run in the circumferential direction between a first and a second coil before the track change region, and rolling elements run in the circumferential direction after the track change region between the second and a third coil.

SUMMARY

According to aspects illustrated herein, there is provided an actuating device for a clutch having a lever element, the actuating device including a stator device, a rotor device configured to rotate with respect to the stator device, a push-pull device having at least one pull element and at least one push element securable to one another and configured to accommodate the lever element therebetween, the push-pull device configured to exert tensile and thrust forces on the lever element of the clutch, and, a carriage device operatively engaged to the push-pull device and movable to a limited extent in axial direction with respect to the rotor device, the carriage device configured to supply tensile and thrust forces to the push-pull device.

According to aspects illustrated herein, there is provided a clutch including a counter-pressure plate, a clutch plate, a contact plate movable to a limited extent in axial direction and configured to clamp the clutch plate frictionally between the contact plate and the counter-pressure plate, a lever element configured to displace the contact plate in axial direction, and, an actuating device operatively engaged to the lever element, the actuating device including a stator device, a rotor device configured to rotate with respect to the stator device, a push-pull device having at least one pull element and at least one push element securable to one another and configured to accommodate the lever element therebetween, the push-pull device configured to exert tensile and thrust forces on the lever element, and, a carriage device operatively engaged to the push-pull device and movable to a limited extent in axial direction with respect to the rotor device, the carriage device configured to supply tensile and thrust forces to the push-pull device.

According to aspects illustrated herein, there is provided an electric drive module including an electric drive motor having a clutch including a counter-pressure plate, a clutch plate, a contact plate movable to a limited extent in an axial direction and configured to clamp the clutch plate frictionally between the contact plate and the counter-pressure plate, a lever element configured to displace the contact plate in axial direction, an actuating device operatively engaged to the lever element, the actuating device including a stator device, a rotor device configured to rotate with respect to the stator device, a push-pull device having at least one pull element and at least one push element securable to one another and configured to accommodate the lever element therebetween, the push-pull device configured to exert tensile and thrust forces on the lever element, and, a carriage device operatively engaged to the push-pull device and movable to a limited extent in axial direction with respect to the rotor device, the carriage device configured to supply tensile and thrust forces to the push-pull device, and, a central flange disposed between the push-pull device and the counter-pressure plate in the axial direction, and, a rotor non-rotatably configured as a housing component for the clutch and connected to the central flange.

According to aspects illustrated herein, there is provided a method for installing a clutch that couples and uncouples an internal combustion engine to and from a drivetrain of a hybrid vehicle, the clutch having a lever element and an actuating device, wherein the actuating device is configured to exert tensile and thrust forces on the lever element by means of a push-pull device which is movable to a limited extent in axial direction, the method including the steps of pre-assembling a push element of the push-pull device having pre-installed sleeves on a release bearing assigned to a carriage device, inserting a pull element having pre-installed bolts between the lever element and a central flange of the clutch, pressing the pre-installed actuating device having the carriage device into the central flange of the clutch while finding a central bearing, and, bolting the pull element to the push element in axial direction.

An object of the present invention is to specify an actuating device for a clutch, which can be connected to a clutch in a simple manner and in particular can be integrated into an electric drive module of a hybrid vehicle. Another object of the present invention is to specify such a clutch having an actuating device as well as an electric drive module. Furthermore, it is an object of the present invention to specify a method for installing such a clutch having an actuating device.

When the actuating device is installed on the clutch, the lever element by means of which the clutch can be engaged and disengaged is accommodated between the pull element and the push element in the axial direction, so that tensile and thrust forces can be transmitted to the lever element.

Since the pull element and the push element are designed as two separate components, which are connectible with one another during installation of the actuating device on the clutch, the installation is easily possible.

Exemplary embodiments of the present invention are explained in the subordinate claims.

In an example embodiment, the pull element and the push element are releasably secured with one another. In an example embodiment, the pull element and the push element are releasably secured with one another by means of a plurality of bolt-and-sleeve connections distributed around the circumference. In this context, the expression "separable", or "releasably secured", means "non-destructively separable." This type of construction makes it possible to uninstall the actuating device in a simple manner and in particular to separate it from the clutch, for example if an error has occurred during installation, or when a repair makes this necessary.

According to an exemplary embodiment, the push element is connected to a release bearing assigned to the carriage device in an axially immovable manner. The push element be non-rotatably connected to the outer ring of the release bearing. The connection can be made with flange sections of the bolts or sleeves of the bolt-and-sleeve connection interposed, so that the bolts or sleeves can be fixed in the axial direction by means of the flange segments disposed between the release bearing and the push element. The bolts or sleeves, in particular the flange segments, may have rotation restraints, so that sleeves can be screwed onto the corresponding bolts from one side or bolts can be screwed into the corresponding sleeves from one side, without having to fix the other threaded partner against turning by means of a second tool.

According to an exemplary embodiment, between the rotor device and the carriage device a roller screw drive is provided, having at least three coils and a recirculating roller system with rolling elements running in a roller raceway, where the roller raceway has a track change region which is designed so that rolling elements run in the circumferential direction between a first and a second coil before the track change region, and rolling elements run in the circumferential direction after the track change region between the second and a third coil. In this way it is possible in particular to produce forces of equal magnitude in the pull and push directions.

In addition to the annular recirculating roller system filled with rolling elements, the rotor device has a yoke. The yoke of the rotor device is rotatably supported, indirectly or directly, on the stator device by means of a thrust bearing, in particular a radial bearing.

The stator device and the rotor device, which is rotatable in relation to the stator device, preferably form an electric motor. The electric motor can be designed as a brushless DC motor or as a three-phase motor, in which magnets, more precisely permanent magnets, are provided on the rotor and coils that are electrifiable in turn are provided on the stator. According to an exemplary embodiment, the electric motor is designed as an external rotor motor; that is, it has the stator device in its interior, which is surrounded by the annular rotatable rotor device. The electric motor may also be designed as an internal rotor motor, however.

The actuating device can be provided with current by means of a power supply, and can be supported in the drivetrain of the motor vehicle in such a way that it must be energized exclusively to engage and disengage the clutch. By means of the roller screw drive, which is situated between the rotor device and the carriage device in the operating direction, a rotational motion of the rotor device is converted to a linear motion of the carriage device. The roller screw drive can be self-arresting. By means of the release bearing, which is designed for example as an angular ball bearing but may also be designed as a tapered roller bearing, cylindrical roller bearing or journal bearing, the carriage device is able to exert tensile and thrust forces on the lever element of the clutch by means of the separable push-pull device.

For example, the stator device may be designed non-rotationally with a carrier component, in particular a housing carrier, so that the electric power can be supplied to the stator device by means of a cable, and without a rotary leadthrough or inductive coupling. The input shaft of the clutch or the output shaft of the internal combustion engine runs in the radial direction within the stator device or within the carrier component. The input shaft is rotatably supported in relation to the stator device or the carrier component.

However, it is also possible for the stator device to be non-rotatably connected to the input shaft of the clutch, that is, for it to rotate at the speed of the internal combustion engine. In this case, a rotary leadthrough or inductive coupling is required in order to energize the actuating device. Energizing the actuating device in one direction produces an increased speed of the rotor device in comparison to the input speed of the drivetrain, which disengages the clutch. Energizing the actuating device in the other direction produces a reduced speed of the rotor device in comparison to the input speed of the drivetrain, which engages the clutch. The process of disengaging the clutch can therefore by initiated by accelerating the rotor device, while the process of engaging the clutch is initiated by decelerating the rotor device. It is likewise possible for the process of disengaging the clutch to be initiated by decelerating the rotor device, while the process of engaging the clutch is initiated by accelerating the rotor device.

According to an exemplary embodiment, the roller screw drive has an outer sleeve into which a form spring is inserted which has a plurality of coils. The form spring can be made from a helically coiled spring wire; and the coiled spring wire can be contoured, that is, it is provided in the axial direction on both sides with a contact contour which is separated by an interposed comb. The adjacent contact contours of two successive coils of the form spring reflect part of the geometry of the rolling element, so that the particular rolling element can be guided in the axial direction in a track running in the circumferential direction between two adjacent coils of the form spring.

To support the form spring, the outer sleeve is closed off by a cover, which is screwed to the outer sleeve by a plurality of screws distributed around the circumference. A spacer can be provided between the cover and the outer sleeve. Spacers are available in various thicknesses, so as, on the one hand, to ensure maximum free-play of the roller screw drive in the axial direction and, on the other hand, to ensure ease of access and in particular jam-free operation of the roller screw drive when operating the actuating device. The axial length of the space in which the helical form spring is situated can therefore be adjusted precisely when assembling the actuating device, by means of the properly fitting spacer.

The space in which the form spring is situated is bounded toward the outside by seals on both sides. Each of the two seals, one of which is provided on the outer sleeve and the other on the cover, is in sliding contact with an inner sleeve, in order to enable the linear motion of the carriage device. The space between the two seals can be filled with grease;

that is, it can be designed as a grease chamber, in order to minimize the friction of the roller screw drive and prevent jamming of the rolling elements.

In an example embodiment, the second coil crosses the track change region exclusively in the area where the roller raceway is deepest. The depth of the roller raceway is determined in the radial direction of the actuating device. This enables the reliable prevention of jamming of the rolling elements when crossing the second coil of the form spring.

According to an exemplary embodiment, the roller raceway has at least one support region essentially in the form of helical threading. The pitch of the helical-thread support region or track change region or entry or exit section is determined in the axial direction against the circumference, for example corresponding to the threading of a screw. The support region transitions via the entry section into the track change region, and the track change region transitions via the exit section into the support region. If a plurality of support regions is provided, it is also possible for the track change region to transition via the exit section into another support region.

In an example embodiment, the track change region jumps back from an end of the entry section in the axial direction to a start of the exit section. The return enables the rollers to be returned to the start of the exit section.

The support region can be situated entirely between a start of the track change region and an end of the track change region in the axial direction. In an example embodiment, the start of the track change region is therefore situated closer in the axial direction to the clutch than the support region, while the end of the track change region is further away in the axial direction from the clutch than the support region. However, in an alternative configuration, it is also possible for the end of the track change region to be situated closer in the axial direction to the clutch than the support region, while the start of the track change region is further away from the clutch in the axial direction than the support region.

According to an exemplary embodiment, the degree of pitch of the track change region is greater than the pitch of the support region. Depending on the choice of reference system, the pitch of the support region is positive, while the pitch of the track change region is very negative. At the same time, the track change region extends in the circumferential direction of the actuating device over a significantly smaller section of the circumference of the rotor device, in particular of the yoke, than the support region.

In an example embodiment, the pitch of the entry section is greater than the pitch of the support region. Alternatively or in addition, the pitch of the exit section is greater than the pitch of the support region. In an exemplary embodiment, the pitches of the entry section and the exit section are equal, and in particular are greater than the pitch of the support region. In an example embodiment, the degree of pitch of the track change region is quantitatively greater than the pitch of the entry section and/or of the exit section. It is also advantageous if the pitch of the support region is uniform.

In an example embodiment, the rolling elements are in the form of balls, and the roller raceway is designed as an encircling ball raceway. In the support region, the ball raceway is preferably essentially U-shaped, with the balls immersed in the ball raceway to half their diameter in the radial direction of the actuating device.

It is also advantageous if the depth of the track change region is essentially equal to, or greater than, the diameter of the balls. This means that in the track change region the balls can be immersed at least almost completely into the ball raceway in the radial direction of the actuating device. The depth of immersion must be at least great enough so that the balls can change from the track situated between the first and second coils in the axial direction of the actuating device to the track situated between the second and third coils in the axial direction, without touching the second coil, in particular the comb of the form spring in the vicinity of the second coil. This should also be ensured if the carriage device tips during operation of the actuating device, so that it is particularly advantageous if the balls can be immersed completely into the ball race in the track change region; i.e. if the diameter of the balls corresponds at least to the depth of the track change region in the radial direction of the actuating device. The diameter is preferably smaller than the depth of the track change region.

In an exemplary embodiment, in an electric motor designed as an external rotor motor, the recirculating roller system is situated at the outside circumference of the rotor device, while accordingly the form spring, between whose coils the rolling elements run, is situated radially outside and is designed as an inside-contoured form spring, where both the comb and the contact contours for the rolling elements point inward in the radial direction. Accordingly, the rotor device has the encircling roller raceway in its outside circumference. It is also possible however, for example when designing the electric motor as an internal rotor motor, to provide the recirculating roller system in the inside circumference of a rotor device, and accordingly to dispose the form spring radially inside and design it as an outside-contoured form spring. Accordingly, the rotor device has the encircling roller raceway in its inside circumference.

The abovementioned object is also fulfilled according to the invention by a clutch, having a counter-pressure plate, a contact plate which is movable to a limited extent in an axial direction to clamp a clutch plate frictionally between the contact plate and the counter-pressure plate, a lever element which acts on the contact plate to move the contact plate in an axial direction, and an actuating device according to at least one of the preceding exemplary embodiments, which is operatively connected to the lever element.

The previously explained actuating device is designed in particular for the clutch of a motor vehicle. The clutch is in particular a friction clutch, as provided between the internal combustion engine and/or an electric motor and the transmission of a motor vehicle, for changing gears. In particular, the actuating device can be provided in hybrid vehicles. The clutch may be designed, on the one hand, as a single clutch, but may also be designed as a multiple clutch, in particular as a dual clutch. In the case of a dual clutch, preferably two actuating devices of the forenamed type should be provided. In particular, the friction clutch may also be designed as a disconnect clutch for coupling and uncoupling the internal combustion engine to and from a drivetrain of a hybrid vehicle, for example in order to minimize moments of inertia and friction when operating purely electrically, by uncoupling the internal combustion engine.

The clutch may be designed either as a dry clutch or as a wet clutch. The clutch may be, on the one hand, engaged in the non-actuated state, that is, a normally engaged clutch, or, on the other hand, disengaged in the non-actuated state, that is, a normally disengaged clutch. In a normally engaged clutch, the lever element on which the actuating device acts is usually designed as a diaphragm spring, whereas in a normally disengaged clutch the lever element on which the actuating device acts is usually designed as a lever spring.

In an example embodiment, the lever element has the characteristic of a catch spring. When the clutch is in the disengaged state, for example, the clutch passes through a negative force region in which the disengaging force is reduced. In order to initiate the engagement process and leave the negative force region, the lever element can be acted on by the pull element; that is, it can be pulled.

In an example embodiment, the lever element is essentially ring-shaped and has tongues disposed in the axial direction between the push element and the pull element. If the clutch is designed, for example, as a normally engaged clutch, then the clutch can be disengaged when the push element comes into contact with the diaphragm spring and transmits thrust forces to the diaphragm spring. If the pull element comes into contact with the diaphragm spring when the clutch is engaged, and transmits tensile forces to the diaphragm spring, then the clamping force of the contact plate can be increased briefly beyond the force of the diaphragm spring, in order to clamp the clutch plate more firmly between the contact plate and the counter-pressure plate. This causes the clutch to have an increased capacity for torque, which is advantageous, for example, if the internal combustion engine is to be started at low temperatures, e.g. at temperatures below 20° C., 25° C. or 30° C., or if the intent is to drive off by means of the internal combustion engine. A higher torque is necessary here than in normal operation of the clutch; that is, the clutch can be designed for lower torque, and peak torques can be transmitted briefly by means of the aforementioned pull element and by the clutch. In particular, this design of the clutch can be combined with the lever element that has the previously explained catch spring characteristic.

In an example embodiment, the push element and the pull element are arranged so that when the actuating device is operated tongues of the lever element can be brought into contact alternately with the push element and the pull element.

According to an exemplary embodiment, a central flange is situated between the push-pull device and the counter-pressure plate in the axial direction. In particular, the central flange is situated between the push-pull device and the contact plate in the axial direction. The central flange is non-rotatably connected to a housing component of the clutch.

The pull element can be situated closer to the central flange in the axial direction than the push element. This is particularly advantageous in a normally engaged clutch.

According to an exemplary embodiment, the central flange has at least one access opening through which the push element and the pull element can be assembled together. This means that the clutch does not have to be installed component by component, but rather sub-assemblies can be made, which can be pre-assembled. These pre-assembled sub-assemblies can then be added to the overall system.

According to an exemplary embodiment, the central flange has at least one positioning opening, through which the push element and the pull element can be positioned relative to one another. This is particularly advantageous when the pre-assembled actuating device and the pre-assembled clutch are being positioned relative to one another, in which state the push element and the pull element are however no longer freely accessible. Nevertheless, the positioning opening makes it still possible to align the two elements relative to one another and then to assemble them together.

A plurality of access openings and a plurality of positioning openings can be distributed around the circumference of the central flange. In particular, it is advantageous if the access openings and positioning openings are arranged alternately around the circumference. It is also advantageous if the access openings are situated at a different radius than the positioning opening, in particular in order to maintain the position of the push element and the pull element relative to one another by means of a positioning tool while the push element and pull element are being connected to one another by means of an assembly tool.

It is advantageous if the pull element has positioning openings, which make it possible to rotate the pull element relative to the push element during installation. The positioning openings of the pull element are preferably situated at the same radius as the positioning openings of the central flange. This enables straight-line access by means of a positioning tool through the central flange to the pull element. In addition, it is particularly advantageous here if the push element also has at least one such positioning element at the same diameter as the pull element and the central flange.

The abovementioned object is also fulfilled according to the invention by an electric drive module, in particular a hybrid module for a hybrid vehicle having an electric drive motor into whose rotor a clutch according to at least one of the preceding exemplary embodiments is integrated, where in particular the rotor of the drive motor is designed as a housing component of the clutch and is non-rotatably connected to the central flange.

The abovementioned object is also fulfilled according to the invention by installing a clutch having an actuating device, in particular a disconnect clutch for coupling and uncoupling an internal combustion engine to and from a drivetrain of a hybrid vehicle, wherein the actuating device is designed to exert tensile and thrust forces on the lever element of the clutch by means of a push-pull device which is movable to a limited extent, using the following steps: pre-assembly of a push element of the push-pull device having pre-installed sleeves on a release bearing assigned to the carriage device, insertion of a pull element having pre-installed bolts between the lever element and a central flange of the clutch, pressing the pre-assembled actuating device with the carriage device into the central flange of the clutch while finding a central bearing, and bolting the pull element together with the push element in the axial direction, in particular through access openings in the central flange.

An optional additional step is the positioning of the pull element in relation to the push element through positioning openings in the central flange, if the pull element and the push element have rotated relative to one another while the pre-assembled actuating device was being pressed into the central flange of the clutch, or into the central bearing which had already been pressed into the central flange.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION

Figure 1:
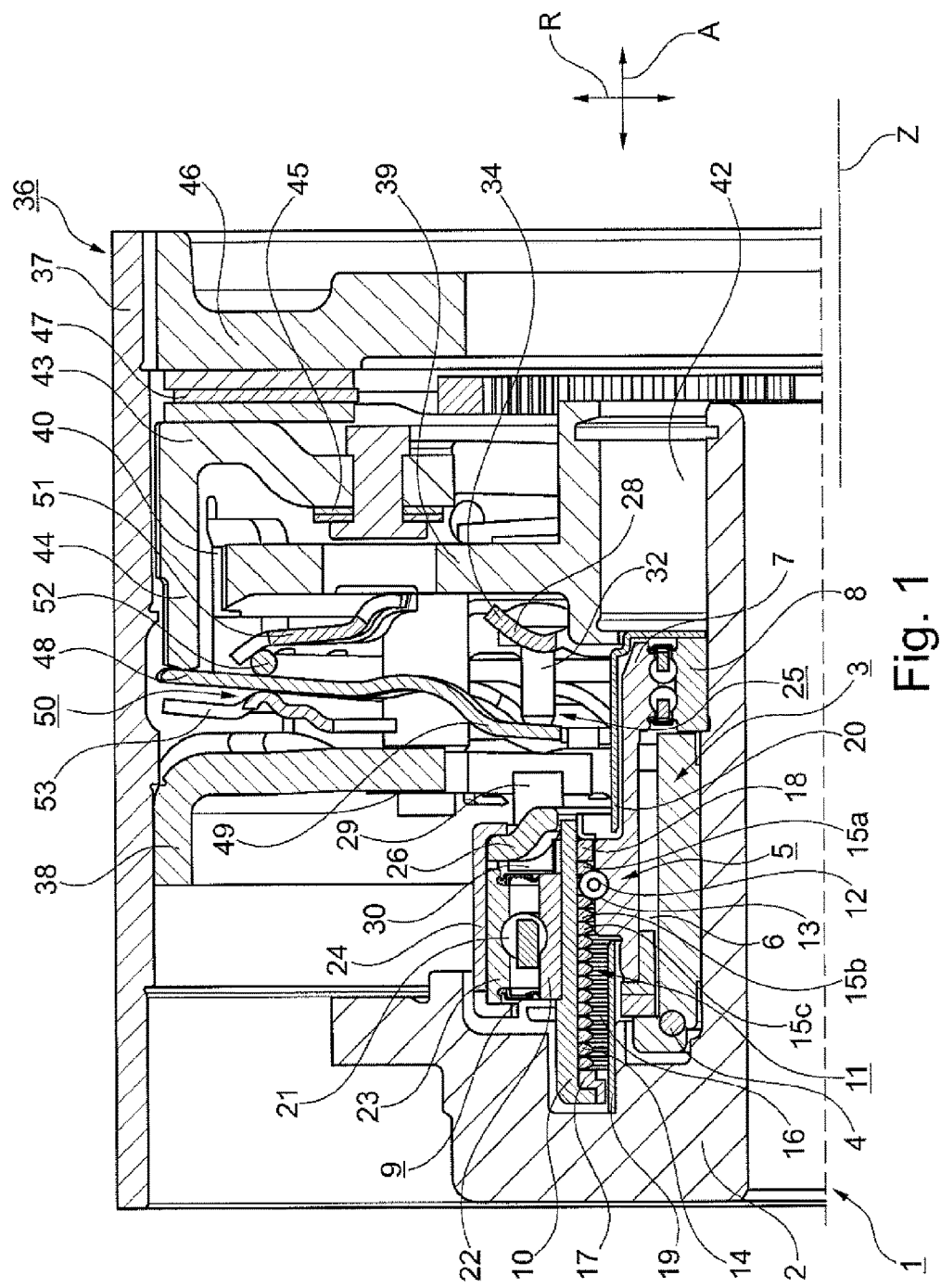
FIG. 1 is a sectional view of an exemplary embodiment of a clutch having an actuating device which has a push-pull device, where the push-pull device has not yet been finally installed, according to the present invention.
Figure 2:
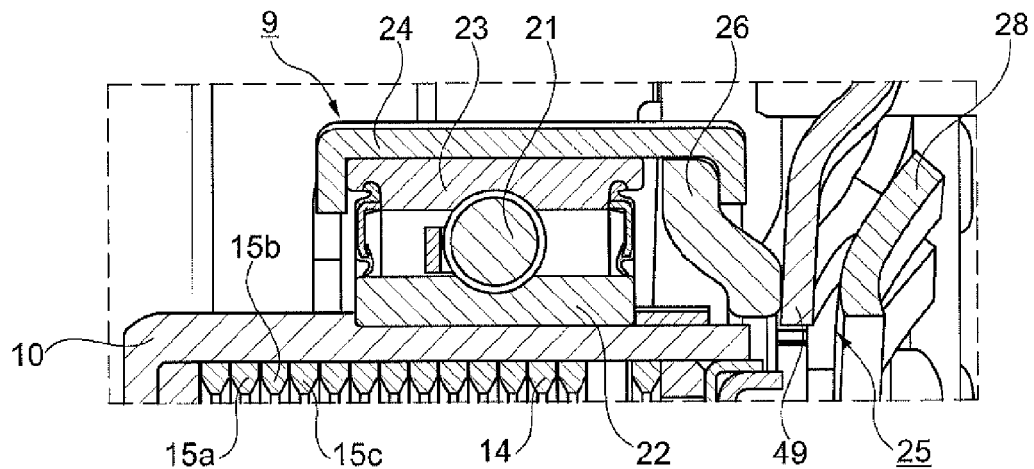
FIG. 2 is a detailed view of a carriage device of the actuating device from FIG. 1.

At the outset, it should be appreciated that like reference characters on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

FIGS. 1 through 8 relate to an exemplary embodiment of actuating device 1 for clutch 36, and to clutch 36 having actuating device 1, in particular for a drivetrain of a motor vehicle. In particular, FIGS. 1 through 8 relate to an electric drive module which is designed in particular as a hybrid module for a hybrid vehicle, wherein clutch 36 is designed as a disconnect clutch for coupling and uncoupling an internal combustion engine to and from the drivetrain of the hybrid vehicle. FIGS. 1 through 8 also relate to a method for installing clutch 36 with actuating device 1; that is, in particular a method for installing an electric drive module, in particular a hybrid module for a hybrid vehicle. Features and procedural steps that are not identified in the present description as essential to the invention are to be understood as optional. The following description therefore also relates to other exemplary embodiments of actuating device 1 for clutch 36, of clutch 36 and actuating device 1, of the electric drive module and of the method for installing clutch 36 and actuating device 1, which have partial combinations of the features and procedural steps which will be explained below.

Clutch 36 is supported so that it can rotate around axis of rotation Z, and has at least one contact plate 43, at least one counter-pressure plate 46 and at least one clutch plate 47 which is situated between contact plate 43 and counter-pressure plate 46 in axial direction A. Counter-pressure plate 46 is firmly connected to housing component 37 of clutch 36, in particular bolted, pinned or meshed, but may also be designed in a single piece with housing component 37. Contact plate 43 is non-rotatably supported in housing component 37, and is movable to a limited extent in axial direction A. In particular, contact plate 43 is non-rotatably connected to housing component 37 by means of leaf springs 45 distributed around the circumference, and is pre-tensioned away from counter-pressure plate 46.

Leaf springs 45 may be attached to housing component 37 or to counter-pressure plate 46 to transmit the torque to contact plate 43 and to pre-tension contact plate 43, but in the depicted exemplary embodiment they are preferably attached to central flange 39 of clutch 36. In the depicted exemplary embodiment, central flange 39 is situated inside housing component 37 on the side of clutch plate 47 opposite counter-pressure plate 46, i.e., in proximity to contact plate 43. Central flange 39 is firmly connected to housing component 37, for example bolted, pinned or meshed, but may also be designed in a single piece with housing component 37. In its radially outer region, central flange 39 has, in proximity to the inner wall of housing component 37, a plurality of cutouts 40 distributed around the circumference, through which cams 44 of the contact plate extend.

Contact plate cams 44 are designed in a single piece with contact plate 43, and extend in axial direction A of clutch 36 from the side of contact plate 43 facing away from counter-pressure plate 46 through cutouts 40 provided in central flange 39, in order to rest against a force rim of lever element 48. Central flange 39 is thus situated in axial direction A between counter-pressure plate 46 and lever element 48, or more precisely between a friction surface of contact plate 43 and lever element 48, while contact plate cams 44 of contact plate 43 extend through central flange 39.

By means of a central bearing (not depicted) situated in area 42, central flange 39 is rotatably supported toward the inside in radial direction R on carrier component 2. Carrier component 2 is to be assigned to actuating device 1. Central bearing 42 is preferably designed as a roller bearing, for example a single-row or double-row ball bearing, in particular a double angular ball bearing, but may also be designed, for example, as a cylindrical roller bearing, a tapered roller bearing or a journal bearing. In radial direction R outside of central bearing 42, central flange 39 is firmly connected to cover component 38 and is spaced apart from the latter, for example by means of stepped pins. In its radial outer region, cover component 38 in turn is attached to housing component 37, or at least rests against it. Cover component 38 delimits actual clutch 36, more precisely the torque-transmitting portion of clutch 36, in axial direction A toward actuating device 1. Lever element 48 extends essentially in radial direction R of clutch 36 inside housing component 37, and in axial direction A between cover component 38 and central flange 39. Lever element 48 preferably has cut-outs, through which the stepped pins, which space cover component 38 and central flange 39 apart, extend in axial direction A.

Lever element 48 may be designed as a diaphragm spring for normally engaged clutch 36, depicted in FIG. 1, and as a lever spring for a normally disengaged clutch. Lever element 48 is braced on the housing side, and is operable by actuating device 1. To this end, lever element 48, which is essentially ring-shaped, has tongues 49 which extend inward in radial direction R from the force rim of lever element 48.

Between cut-outs of tongues 49 the previously named stepped pins preferably extend, which space cover component 48 and central flange 49 apart. Tongues 49 can be brought into operative connection with push-pull device 25 of actuating device 1, which will be explained in greater detail below, in order to engage or disengage clutch 36.

In normally engaged clutch 36, the effective force of lever element 48 in the form of a diaphragm spring outweighs the opposing force of leaf springs 45, while in a normally disengaged clutch the opposing force of leaf springs 45 outweighs the effective force of the lever element in the form of a lever spring. Accordingly, actuation of the diaphragm spring of normally engaged clutch 36 by actuating device 1 results in disengagement of clutch 36 by tipping or popping the diaphragm spring, that is, lifting contact plate 43 and removing contact plate 43 from counter-pressure plate 46, while actuation of the lever spring in a normally disengaged clutch by the actuating device results in engaging the clutch by tipping the lever spring.

With clutch 36 engaged, torque is transmitted frictionally to clutch plate 47 from the input side of clutch 36, for example from a dual-mass flywheel or an internal combustion engine or an electric drive motor, through the clutch housing and both counter-pressure plate 46 and contact plate 43, both of which are non-rotatably connected to the clutch housing, in particular to housing component 37. From the clutch plate 47, which is frictionally clamped between counter-pressure plate 46 and pressure plate 43, the torque is transmitted to the output side of clutch 36, for example to an input shaft of a transmission.

Other means of transmission are also possible, however, in particular in the exemplary embodiment that is depicted in FIG. 1, and that is preferably provided in a hybrid drivetrain of a hybrid vehicle. For example, clutch 36 may be designed as a disconnect clutch for coupling and uncoupling the internal combustion engine to and from the hybrid drivetrain. To this end, the internal combustion engine, more precisely the output shaft of the internal combustion engine or the output side of a dual-mass flywheel situated between the internal combustion engine and clutch 36, can be connected to clutch plate 47 so that it transmits torque.

An electric drive motor (not depicted in FIG. 1) is positioned in the outside circumference of clutch 36 in such a way that a rotor of the electric drive motor is non-rotatably connected to housing component 37, or is designed in a single piece with housing component 37. The torque of the electric drive motor, which is designed as an internal rotor motor, therefore also acts on central flange 39, contact plate 43 and counter-pressure plate 46, even when clutch 36 is disengaged. Upon engaging clutch 36, the torque of the electric drive motor can be used to start the internal combustion engine. Furthermore, with clutch 36 engaged, the torque of the electric drive motor and of the internal combustion engine can be used to propel the motor vehicle. It is equally possible, with clutch 36 engaged, to drive exclusively with the internal combustion engine and to operate the electric drive motor in generator mode in order to charge a storage battery.

As, due to the frictional engagement, both the friction linings of clutch plate 47, and also to a lesser degree the friction surfaces of counter-pressure plate 46 and of contact plate 43, are subject to wear, over the lifetime of clutch 36 contact plate 43 must be moved closer and closer to counter-pressure plate 46 in order to compensate for the loss of thickness of the friction linings and of the thickness of the friction surfaces in axial direction A, and to be able to produce frictional engagement and to engage clutch 36. To this end, clutch 36 in the exemplary embodiment that is depicted in FIG. 1 is equipped with force-based wear adjustment device 50. Wear adjustment device 50 has sensor spring 51, which is clamped indirectly or directly between central flange 39 and lever element 48. Furthermore, wear adjustment device 50 has adjusting ring 53 which is situated between lever element 48 and cover component 38, and whose ramps are situated so that they can slide on opposing ramps that are formed on cover component 38. Furthermore, adjusting ring 53 is pre-tensioned in relation to cover component 38 by at least one drive device, in particular a drive spring, in such a way that the ramps of adjusting ring 53 can slide up on the opposing ramps of cover component 38 under the pre-tensioning of the spring.

When the thickness of the friction linings of clutch plate 47 in particular decreases due to clutch wear, to engage clutch 36 lever element 48 designed as a diaphragm spring presses contact plate 43 by means of contract plate cams 44 further in the direction of counter-pressure plate 46, that is, to the right in reference to FIG. 1, in order to clamp clutch plate 47 frictionally between contact plate 43 and counter-pressure plate 46, that is, to engage clutch 36. At the same time, lever element 48 must rise up more strongly, which causes the force level of lever element 48 to increase. When disengaging clutch 36, the elevated force level of lever element 48 causes sensor spring 51 to be moved; that is, the clutch wear is sensed, and causes lever element 48 to lift off of adjusting ring 53, which is pre-tensioned in the circumferential direction, due to the movement of sensor spring 51. This causes adjusting ring 53 to be free of clamping force, so that it can rotate relative to cover component 38 while the drive spring is tensioned, whereupon the ramps of adjusting ring 53 slide up on the opposing ramps of cover component 38 until adjusting ring 53 again comes into contact with lever element 48 and thus is clamped; that is, until the clutch wear has been adjusted for.

Although only force-based wear adjustment device 50 is depicted in FIG. 1, it should be mentioned at this point that a distance-based wear adjustment device can also be provided. It is likewise possible to dispense with a wear adjustment device, for example if clutch 36 is designed for only a short service life, in which clutch wear can be ignored, or if the clutch wear can be reduced to an acceptable level during the service life by appropriate component designs.

In the depicted exemplary embodiment, sensor spring 51 acts indirectly on lever element 48, since wire ring 52 is provided between sensor spring 51 and lever element 48. Wire ring 52 defines a pivot support, by means of which lever element 48 is tiltably supported to engage and disengage clutch 36. However, this tilt support can also be provided separately from wear adjustment device 50, for example by wire ring 52 being supported on the step pins, or on central flange 39 or on cover component 38. Wire ring 52 can also be completely dispensed with, for example if appropriately shaped contact cams are formed on central flange 39 and/or on cover component 38, by means of which lever element 48 can be pivoted.

Actuating device 1 connected to clutch 36, or actuating device 1 integrated into clutch 36, which acts on tongues 49 of lever element 48, has stator device 3 and rotor device 5 which is rotatable in relation to stator device 3. For example, stator device 3 may be designed so that it is non-rotating relative to carrier component 2, in particular to a housing carrier. Stator device 3 and rotor device 5 preferably make an electric motor, in particular a brushless DC motor or a three-phase motor. To this end, stator device 3 is provided with power supply 4, in order to produce an alternating electromagnetic field in coils (not shown) on the stator. Rotor device 5 has magnets 6, more precisely permanent magnets, to interact magnetically with the electromagnets on the stator.

The electric motor is preferably designed as a so-called external rotor motor; that is, stator device 2 is situated inside rotor device 5 in radial direction R of actuating device 1 or of clutch 36. However, it is also possible to design the electric motor as an internal rotor motor; that is, to dispose stator device 2 outside rotor device 6 in radial direction R.

Rotor device 5 depicted in FIG. 1 has yoke 7, which is braced by thrust bearing 8 in radial direction R on the side of clutch 36, that is, on the right side in reference to FIG. 1. In the depicted exemplary embodiment, thrust bearing 8 is thus situated on the opposite side of the power supply for stator device 3, in axial direction A of actuating device 1 and of clutch 36. Thrust bearing 8 may be connected to stator device 3 indirectly or directly. Thrust bearing 8 is preferably designed as a roller bearing, in particular as a ball bearing, preferably a double ball bearing as shown. However, a cylindrical roller bearing or a journal bearing is also possible.

In addition to stator device 3 and rotor device 5, actuating device 1 has carriage device 9, which is movable to a limited extent in axial direction A and which provides tensile and thrust forces. Carriage device 9 is situated outside rotor device 5 in radial direction R. Carriage device 9 has outer sleeve 10, which is closed off on the side of power supply 4 for stator device 3, that is, on the left side in reference to FIG. 1, by a cover which is not depicted as a separate component. In axial direction A between outer sleeve 10 and the cover, a spacer (not depicted as a separate component) is situated, in order to define and adjust the axial length of the construction space delimited by outer sleeve 10 and the cover for form spring 14 of roller screw drive 11, which will be explained in greater detail below, The cover is screwed through the spacer to outer sleeve 10 by means of a plurality of screws (not shown) which are situated around the circumference of activating device 1 or of clutch 36.

On both sides of carriage device 9 in axial direction A seals 17, 18 are provided, which seal off the space in which form spring 14 of roller screw drive 11 is situated, toward the outside. First and second seals 17, 18 are made, for example, as ring-shaped lip seals of an elastomer or a rubber or India rubber material. Inside in radial direction R, the first seal is in sliding contact with first inner sleeve 19, while second seal 18 is in sliding contact with second inner sleeve 20. Both inner sleeves 19, 20 are connected indirectly or directly, preferably non-rotatably connected, to stator device 3 or carrier component 2, in particular the housing carrier. Inner sleeves 19, 20, seals 17, 18, the cover and the outer sleeve 10 delimit grease chamber 16, in which form spring 14 of roller screw drive 11 is situated.

Outside of outer sleeve 10 in radial direction R, release bearing 21 is provided. Inner ring 22 of release bearing 21 is non-rotatably connected to outer sleeve 10, for example by press fitting, but may also be made in a single piece with outer sleeve 10. Outer ring 23 of release bearing 21 is rotatable with respect to inner ring 22 and is non-rotatably disposed in bearing sleeve 24, for example by press fitting, or is made in a single piece with bearing sleeve 24. Bearing sleeve 24 may have one or two collar sections, which cover one or both faces of release bearing 21 a least partially. In the depicted exemplary embodiment, release bearing 21 is designed as a single-row ball bearing, but may also be, for example, a multi-row ball bearing, angular ball bearing, tapered roller bearing, cylindrical roller bearing or journal bearing. Carriage device 9 acts through outer sleeve 10, release bearing 21 and push-pull device 25, which is connected to release bearing 21 by means of bearing sleeve 24, on tongues 49 of lever element 48, which are located inside in radial direction R, to disengage and engage clutch 36. Both tensile and thrust forces can be transmitted for this purpose.

Roller screw drive 11 is preferably positioned in radial direction R between rotor device 5 and carriage device 9. In the depicted exemplary embodiment, form spring 14 of roller screw drive 11 comprises fourteen coils; in principle, any number of coils greater than or equal to three is possible.

In addition to form spring 14, roller screw drive 11 has a recirculating roller system with roller raceway 13, in which rolling elements 12 are situated in a row, or possibly also in a plurality of rows, spaced apart from each other in axial direction A, preferably distributed around the entire circumference. On one hand, roller raceway 13 may be connected to rotor device 5, in particular yoke 7, as a separate component, but it may also be made in a single piece with rotor device 5 or yoke 7, as depicted in FIG. 1. In particular, roller raceway 13 is formed in the outer circumference of rotor device 5 or of the yoke 7, when actuating device 1 is driven by means of an external rotor motor. Conversely, if actuating device 1 is driven by means of an internal rotor motor, it is advantageous if roller raceway 14 of the recirculating roller system is situated in the inner circumference of rotor device 5 or of yoke 7.

Rolling elements 12 run in grease chamber 16, which is sealed off in axial direction A by seals 17, 18, and are preferably in the form of balls. It is also possible, however, for rolling elements 12 to be designed as needles, or to have a cask or barrel shape. Corresponding to the outside contour of rolling elements 12, form spring 14 has a contact contour against which surface regions of rolling elements 12 rest. The said contact contour corresponds essentially to the corresponding surface region of the rolling element or elements 12. In the depicted exemplary embodiment, the coils of form spring 14 have two contact contours spaced apart from each other in axial direction A, which are separated from each other by a comb positioned between them.

Form spring 14 is designed as inside-contoured form spring 14, since rolling elements 12 run inside form spring 14 in radial direction R. Conversely, it is also possible, however, for form spring 14 to be designed as outside-contoured form spring 14, when an internal rotor motor is used.

Roller raceway 13 of the recirculating roller system has a track change region (not depicted), designed in such a way that rolling elements 12 run in the circumferential direction before the track change region in a support region of roller raceway 13, and in axial direction A between first and a second coil 15*a*, 15*b* of form spring 14, and rolling elements 12 run in the circumferential direction after the track change region in the support region of roller raceway 13, and in axial direction A between second and third coil 15*b*, 15*c* of form spring 14. Between first and second coils 15*a*, 15*b* of form spring 14 a first track is thus defined in the circumferential direction for rolling elements 12, while between second and third coils 15*b*, 15*c* of form spring 14 a second track is defined in the circumferential direction for rolling elements 12. It should be pointed out at this stage that first coil 15*a*, second coil 15*b* and third coil 15*c* represent three sequential coils of form spring 14, which can be formed anywhere on form spring 14 in axial direction A.

Depending on the position of carriage device 9, second coil 15b intersects with the track change region when actuating device 1 is viewed from the side. It is advantageous here if second coil 15b crosses the track change region exclusively in the area where roller raceway 13 is deepest, as determined in radial direction R. The track change region has a greater depth in radial direction R than the support region. The support region transitions via an entry section into the track change region, and the track change region transitions via an exit section into the support region. The depth of roller raceway 13 in radial direction R increases continuously in the entry section from the support region to the track change region. The depth of roller raceway 13 in radial direction R decreases continuously in the exit section from the track change region to the support region.

The support region of roller raceway 13 has essentially the form of screw threading. The pitch of the support region corresponds essentially to the pitch of form spring 14 in this region; more precisely, to the pitch of the track between first and second coils 15a, 15b and between second and third coils 15b, 15c of form spring 14.

In the entry section, which is formed before the track change region in the circumferential direction, roller raceway 13 is designed so that rolling elements 12 are guided through both first coil 15a and second coil 15b of form spring 14 while plunging into the track change region. Furthermore, in the exit section, which is situated after the track change region in the circumferential direction, roller raceway 13 is designed so that rolling elements 12 are guided through both second coil 15b and third coil 15c while emerging from the track change region.

The track change region jumps back from an end of the entry section in the axial direction to a start of the exit section. The support region is situated entirely between a start of the track change region and an end of the track change region in axial direction A. Thus, the track change region jumps back in axial direction A in particular before a start of the support region.

The pitch of the track change region is quantitatively greater than the pitch of the support region, so that the track change region extends over a shorter segment region of the recirculating roller system in the circumferential direction than the support region. The pitch of the entry section is greater than the pitch of the support region. Furthermore the pitch of the exit section is greater than the pitch of the support region. In particular, the pitch of the support region is uniform, while the pitch of the entry section and of the exit section, as well as the pitch of the support region, is preferably also uniform.

As mentioned previously, rolling elements 12 preferably have the form of balls. Roller raceway 13 is preferably designed as an encircling ball raceway. In the track change region, it must be ensured that rolling elements 12, that is, the balls, are able to duck through in radial direction R under the comb of second coil 15b of form spring 14, in order to complete the track change from the one track between first and second coils 15a, 15b to the other track between second and third coils 15b, 15c. To this end, it is advantageous if the maximum depth of the track change region when crossing second coil 15b of form spring 14 is essentially equal to the diameter of the balls. Preferably, the maximum depth of the track change region is greater than the diameter of the balls, so that the latter can be immersed completely into the ball raceway and reliably do not touch the comb of second coil 15b of form spring 14.

During operation of actuating device 1, a rotation of rotor device 5 through appropriate energization of stator device 3 results in a rotation of the recirculating roller system and roller raceway 13 around axis of rotation Z of actuating device 1 or clutch 36. Rolling elements 12 traverse the tracks between first and second coils 15a, 15b of form spring 14 and between second and third coils 15b, 15c of form spring 14 inside roller screw drive 11, while rolling elements 12 circulate in roller raceway 13, which causes the tracks to rotate in axial direction A, and the rotary motion of rotor device 5 is translated into a linear motion of carriage device 9, in which form spring 14 is firmly supported axially. The linear motion of carriage device 9 can be used to operate clutch 36 indirectly or directly. The construction of actuating device 1 enables it to transmit both tensile forces and thrust forces.

Since roller screw drive 11 is preferably self-arresting, the energization of stator device 3 is preferably necessary only when the operating mode of clutch 36 needs to be changed. The energization can occur in both directions of rotation of rotor device 5, where rotation in one direction engages clutch 36 and rotation in the opposite direction disengages clutch 36. However, with co-rotating stator device 3 other types of energization are also possible.

To be able to transmit both tensile forces and thrust forces to tongues 49 of the essentially ring-shaped lever element 48, push-pull device 25 has both essentially ring-shaped pull element 28 and essentially ring-shaped push element 26. Tongues 49 of lever element 48 are situated between push element 26 and pull element 28 in axial direction A. Push element 26 and pull element 28 are positioned in such a way that when actuating device 1 is actuated, tongues 49 of lever element 48 can be brought into contact with push element 26 and pull element 28 alternately, and preferably not simultaneously. To this end, push element 26 and pull element 28 are spaced apart from one another in axial direction A and connected to one another by bolt-and sleeve connections 29, 32. The connection is preferably made by a plurality of bolt-and-sleeve connections 29, 32 distributed around the circumference, and is separable, that is, non-destructively separable.

Push-pull device 25, more precisely push element 26 and pull element 28, are situated between release bearing 21 and central flange 39 in axial direction A. Central flange 39 is situated between push-pull device 25 and counter-pressure plate 46 in axial direction A, more precisely between push-pull device 25 and actual contact plate 43 without contact plate cams 44. Pull element 28 is situated closer to central flange 39 in axial direction A than push element 26.

Figures 5, 6:
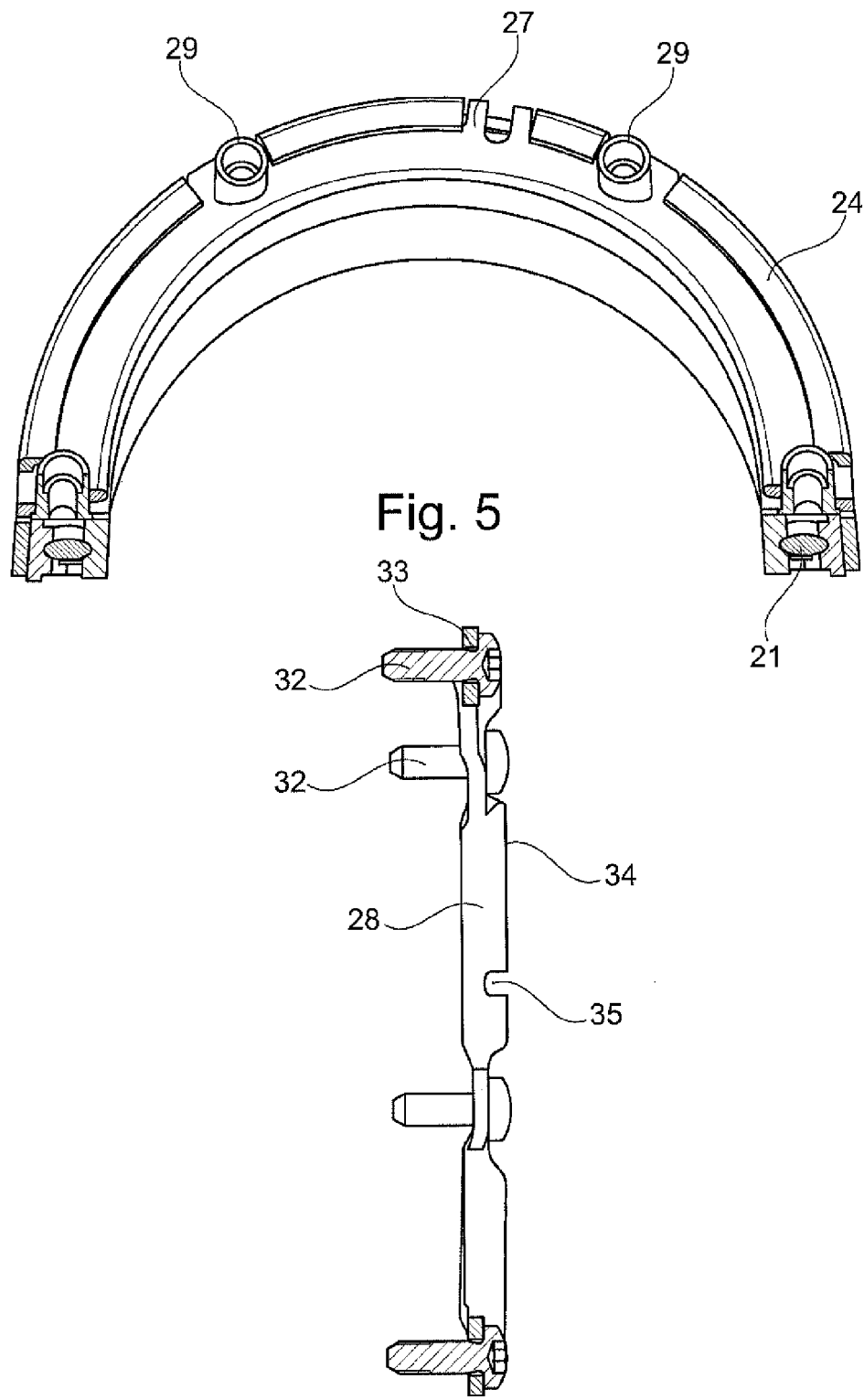
FIG. 5 is a top view of the push element of the push-pull device from FIG. 3 with underlying release bearing.
FIG. 6 is a sectional view of a pull element of the push-pull device from FIG. 3.

Each of the bolt-and-sleeve connections distributed around the circumference has bolt 32 and sleeve 29, which is designed in particular as a threaded sleeve. In the depicted exemplary embodiment, sleeves 29 are provided on push element 26, that is, set into push element 26 or made in a single piece with push element 26, while bolts 32 are provided on pull element 28, and are held there loss-proof by means of installation retainers 33 when pull element 28 is in the non-installed state, as depicted in FIG. 6. In principle, however, a contrary construction is also possible, namely to provide bolts 32, designed in particular as threaded pins, on push element 26, and to provide sleeves 29, which are equipped in particular with an access opening for a tool, loss-proof on pull element 28.

Figure 3:
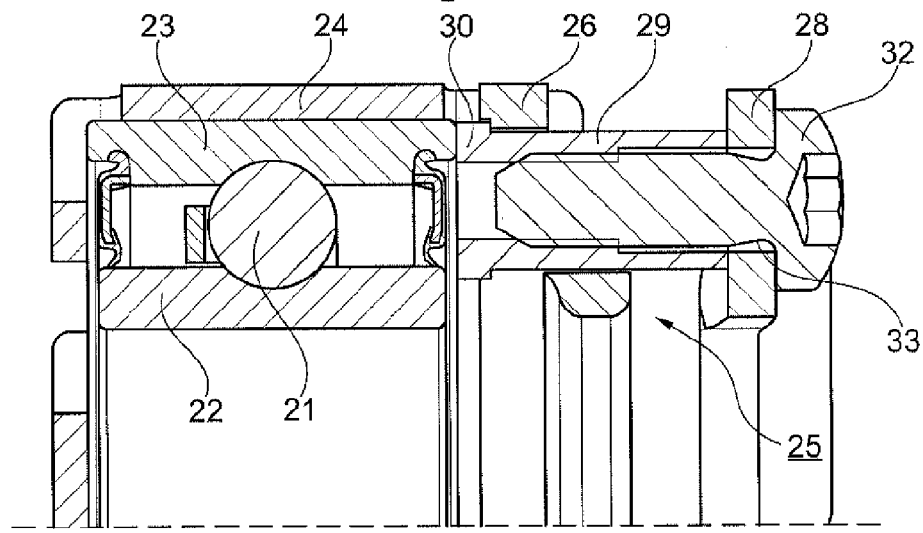
FIG. 3 is a detail view of the push-pull device with a release bearing of the actuating device from FIG. 1.
Figure 4:
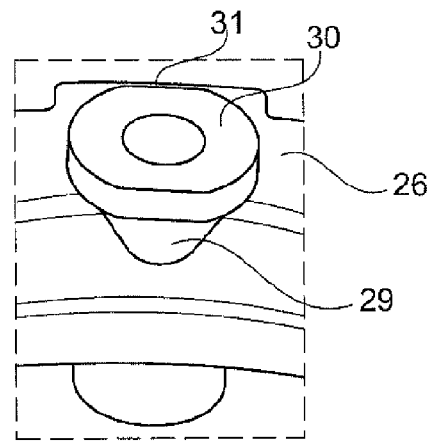
FIG. 4 is a detail view of a push element of the push-pull device from FIG. 1.

As can be seen in particular from FIGS. 3 and 4, each of sleeves 29 has on its back end collar section 30, which is situated between the clutch-side face of release bearing 21 and back side of push element 26 in axial direction A. Since push element 26 is held in position by a flange of bearing sleeve 24, the respective sleeve 29 can be held firmly between outer ring 23 of release bearing 21 and push element 26 in axial direction A. To prevent rotation of sleeve 29 when making the threaded connections, sleeve 29, more precisely collar section of sleeve 29, preferably has at least one anti-rotation retention element 31. As shown in FIG. 4, the anti-rotation element is preferably designed as a flattened surface in the otherwise round surface area of collar section 30, and is in contact with a corresponding opposing surface of push element 26.

Push element 26 has at least one centering means 27, in order to make a fixed orientation in the circumferential direction relative to bearing sleeve 24 possible. As depicted in FIG. 5, centering means 27 is preferably designed as a radial projection on push element 26, which engages with a corresponding cut-out in bearing sleeve 24. However, other forms of centering means 27 are also possible.

Figure 7:
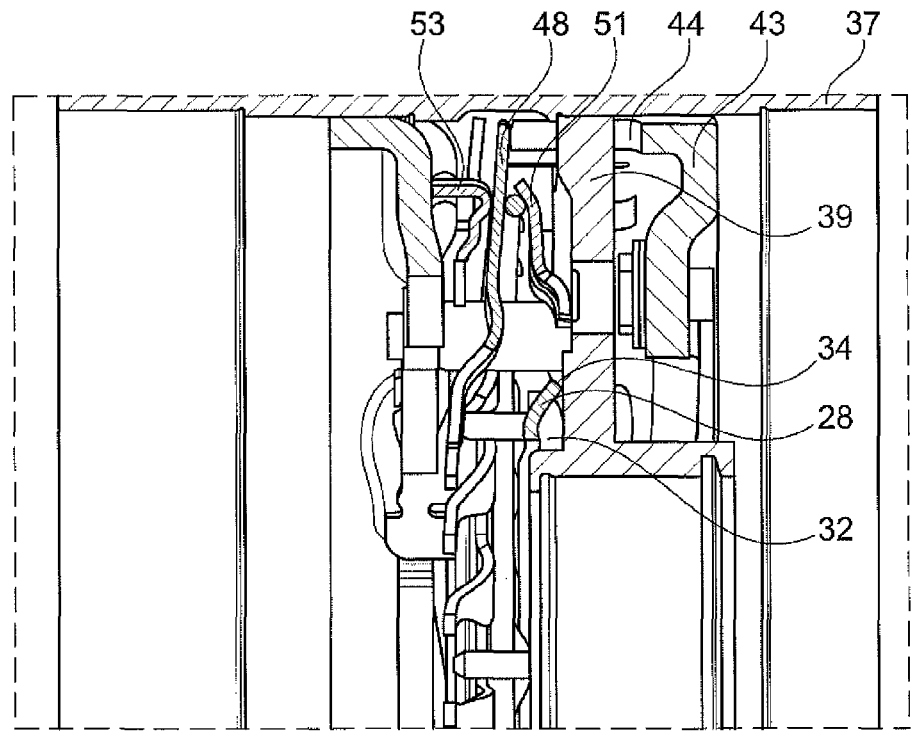
FIG. 7 is a sectional view of a pre-assembled assembly of the clutch from FIG. 1 with the pull element inserted; and, FIG. 8 is a sectional view of the pre-assembled assembly of the clutch with the pull element inserted, from FIG. 7.
Figure 8:
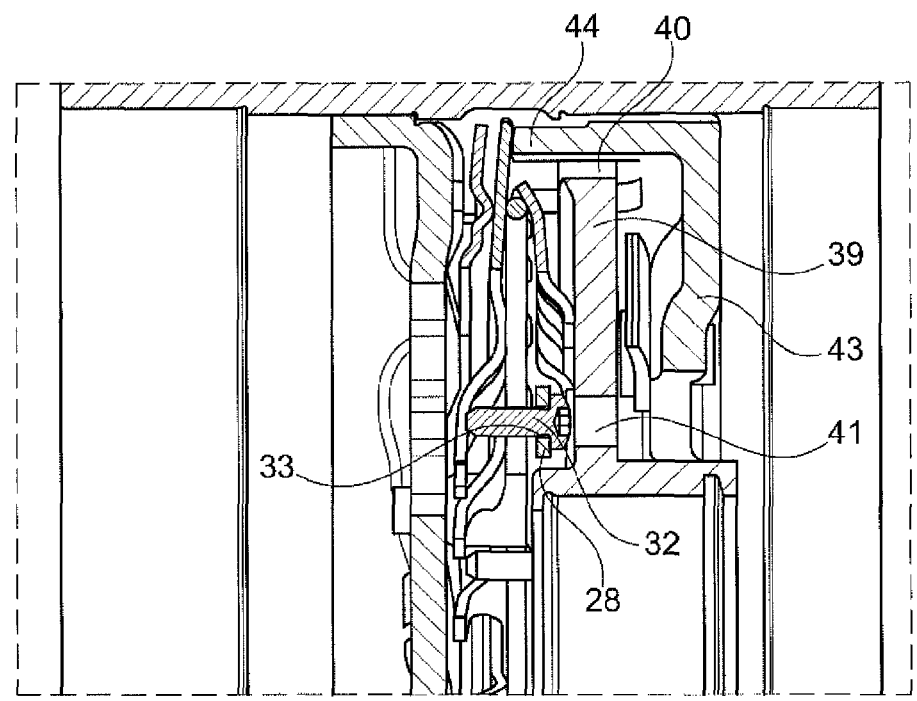

To enable installation of a pre-assembled clutch group, depicted for example in FIGS. 7 and 8, with pre-assembled actuating device 1, central flange 39 has a plurality of access openings 41 distributed around the circumference, through which push element 26 and pull element 28 can be assembled together. Access openings 41 are situated essentially on the same radius as bolts 32, which are held loss-proof in pull element 28.

To enable alignment of pull element 28 with push element 26 in the circumferential direction prior to installation, central flange 39 has a plurality of positioning openings distributed around the circumference, through which push element 26 and pull element 28 can be positioned relative to one another. Similarly, pull element 28 has positioning openings 35, so that it can be rotated relative to push element 26 by a positioning tool that is inserted through the positioning openings in central flange 39. Corresponding positioning openings can also be provided additionally on push element 26, for example in the vicinity of centering means 27, in order to guarantee the congruent orientation of push element 26 and pull element 28 while making the bolted connection. All positioning openings preferably have the form of elongated holes, with the positioning openings in the central flange 39 in particular preferably having the form of elongated circular arc segment holes. Furthermore, all positioning openings are preferably situated at the same radius.

In central flange 39, access openings 41 for the bolted connection and the positioning openings are distributed around the circumference, preferably distributed alternately. Access openings 41 for the bolted connection are preferably situated at a different radius than the positioning openings, in order to prevent a collision of the tool for maintaining the positioning and the tool for bolting pull element 28 to push element 26.

For installing clutch 36 with actuating device 1, it is therefore expedient to pre-assemble previously described actuating device 1; that is, to design it as a sub-assembly. Pre-assembled actuating device 1 includes push element 26 of push-pull device 25 with pre-installed sleeves 29, with push element 26 being attached to release bearing 21 by means of bearing sleeve 24. Carriage device 9 is preferably in a retracted axial position, so that tongues 49 of lever element 48 can neither rest against push element 26 nor collide with sleeves 29. In reference to FIG. 1, this means that carriage device 9 has moved as far as possible to the left in axial direction A.

In the pre-assembled assembly of clutch 36, that is, the extended sub-assembly, pull element 28 with its loss-proof pre-installed bolts 32 is placed between lever element 48 and central flange 39 of clutch 36 in axial direction A. In this state, by means of its contact zones 34 the central flange rests on the surface of central flange 39 facing lever element 48.

Next, the pre-assembled actuating device 1, which has carriage device 9, is pressed into central flange 39 of the pre-assembled assembly of clutch 36 while finding central bearing 42. In principle, it is possible here for central bearing 42 to have already been pressed onto carrier component 2 of actuating device 1, or for central bearing 42 already to have been pressed into central flange 39, or for central bearing 42 to be pressed between carrier component 2 and central flange 39 only after pre-assembled actuating device 1 and the pre-assembled assembly of clutch 36 are firmly positioned axially relative to one another.

If sleeves 29 on the push element side and bolts 32 on the pull element side should not be congruent, pull element 28 and push element 26 can be positioned relative to each other through the positioning openings provided in central flange 39, by means of their positioning openings 35 and possibly centering means 27. Next, pull element 28 is bolted to push element 26 in axial direction A through access openings 41 provided in central flange 39, by means of an appropriate bolt driving tool.

The preceding exemplary embodiments relate to actuating device 1 for clutch 36, having stator device 3, rotor device 5 which is rotatable in relation to stator device 3 and carriage device 9 which is movable to a limited extent in axial direction A in relation to rotor device 5 and which supplies tensile and thrust forces, which is operatively connected to push-pull device 25 that is designed to exert tensile and thrust forces on lever element 48 of clutch 36, where push-pull device 25 has at least one pull element 28 and at least one push element 26, between which lever element 48 can be accommodated, and which are connectible to one another.

The forenamed object is also fulfilled according to the invention by clutch 36 having counter-pressure plate 46, contact plate 43 which is movable to a limited extent in axial direction A to clamp clutch plate 47 frictionally between contact plate 43 and counter-pressure plate 46, lever element 48 which acts on contact plate 43 to move contact plate 43 in axial direction A, and actuating device 1 according to at least one of the preceding exemplary embodiments, which is operatively connected to lever element 48.

Furthermore, the preceding exemplary embodiments also relate to an electric drive module, in particular a hybrid module for a hybrid vehicle, having an electric drive motor into whose rotor clutch 36 according to at least one of the preceding exemplary embodiments is integrated, where in particular the rotor of the drive motor is designed as housing component 37 of clutch 36 and is non-rotatably connected to central flange 39.

In addition, the preceding exemplary embodiments also relate to a method for installing clutch 36 having actuating device 1, in particular a disconnect clutch for coupling and uncoupling an internal combustion engine to and from a drivetrain of a hybrid vehicle, wherein actuating device 1 is designed to exert tensile and thrust forces on lever element 48 of clutch 36 by means of push-pull device 25 which is movable to a limited extent in axial direction A.

An exemplary method includes the steps of: pre-assembling push element 26 of the push-pull device 25 having pre-installed sleeves 29 on release bearing 21 assigned to carriage device 9, inserting pull element 28 having pre-installed bolts 32 between lever element 48 and central flange 39 of clutch 36, pressing pre-installed actuating device 1 having carriage device 9 into central flange 39 of clutch 36 while finding central bearing 46, and, bolting pull element 28 to push element 26 in axial direction A, in particular through access openings 41 in central flange 39.

Thus, it is seen that the objects of the present invention are efficiently obtained, although modifications and changes to the invention should be readily apparent to those having ordinary skill in the art, such modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

LIST OF REFERENCE CHARACTERS

1 Actuating device
2 Carrier component
3 Stator device
4 Power supply
5 Rotor device
6 Magnet
7 Yoke
8 Thrust bearing
9 Carriage device
10 Outer sleeve
11 Roller screw drive
12 Rolling element
13 Roller raceway
14 Form spring
15a First coil
15b Second coil
15c Third coil
16 Grease chamber
17 First seal
18 Second seal
19 First inner sleeve
20 Second inner sleeve
21 Release bearing
22 Inner ring
23 Outer ring
24 Bearing sleeve
25 Push-pull device
26 Push element
27 Centering means
28 Pull element
29 Threaded sleeve
30 Collar section
31 Anti-rotation retainer
32 Bolt
33 Installation retainer
34 Contact area
35 Positioning opening
36 Clutch
37 Housing component
38 Cover component
39 Central flange
40 Cutout
41 Access opening
42 Central bearing
43 Contact plate
44 Contact plate cams
45 Leaf spring
46 Counter-pressure plate
47 Clutch plate
48 Lever element
49 Tongue
50 Wear adjustment device
51 Sensor spring
52 Wire ring
53 Adjusting ring
A Axial direction
R Radial direction
Z Axis of rotation

What is claimed is:

1. A clutch, comprising:
   a counter-pressure plate;
   a clutch plate;
   a contact plate movable to a limited extent in axial direction and configured to clamp the clutch plate frictionally between the contact plate and the counter-pressure plate;
   a lever element configured to displace the contact plate in axial direction; and,
   an actuating device operatively engaged to the lever element, the actuating device comprising:
      a stator device;
      a rotor device configured to rotate with respect to the stator device;
      a push-pull device having at least one pull element and at least one push element securable to one another, the lever element extending radially inward beyond the at least one pull element and the at least one push element, the push-pull device configured to exert tensile and thrust forces on the lever element; and,
      a carriage device operatively engaged to the push-pull device and movable to a limited extent in axial direction with respect to the rotor device, the carriage device configured to supply tensile and thrust forces to the push-pull device.

2. The clutch of claim 1, wherein the pull element and the push element are releasably secured to one another.

3. The clutch of claim 2, wherein the pull element and the push element are releasably secured means of a plurality of bolt-and-sleeve connections circumferentially displaced from each other.

4. The clutch of claim 1, wherein the push element is secured to a release bearing assigned to the carriage device, wherein the push element is fixed in the axial direction with respect to the release bearing.

5. The clutch of claim 4, wherein the push element is non-rotatably secured to an outer ring of the release bearing.

6. The clutch of claim 1, wherein a roller screw drive is disposed between the rotor device and the carriage device, the roller screw drive having at least three coils and a recirculating roller system with rolling elements running in a roller raceway, the roller raceway having a track change region configured to enable rolling elements to run in the circumferential direction between a first and a second coil before the track change region, and rolling elements run in the circumferential direction after the track change region between the second and a third coil.

7. The clutch of claim 1, wherein the lever element is essentially ring-shaped and has a plurality of tongues disposed between the push element and the pull element in axial direction.

8. The clutch of claim 7, wherein the actuating device operatively engages the plurality of tongues with push element and the pull element configured to enable the plurality of tongues to be brought into contact alternately with the push element and the pull element.

9. The clutch of claim 1, further comprising a housing component, and a central flange non-rotatably connected to the housing component and disposed between the push-pull device and the counter-pressure plate in the axial direction.

10. The clutch of claim 9, wherein the central flange is disposed between the push-pull device and the contact plate.

11. The clutch of claim 9, wherein the pull element is situated closer to the central flange in the axial direction than the push element.

12. The clutch of claim 9, wherein the central flange has at least one access opening through which the push element and the pull element can be assembled together.

13. The clutch of claim 9, wherein the central flange has at least one positioning opening through which the push element and the pull element can be positioned relative to one another.

14. The clutch of claim 9, wherein a plurality of access openings and a plurality of positioning openings are alternatingly distributed around the circumference of the central flange, and the access openings are situated at a different radius than the positioning openings.

15. The clutch of claim 9, wherein the pull element has positioning openings that enable a rotation of the pull element relative to the push element during the installation, and which are preferably situated at the same radius as the positioning openings of the central flange.

16. A clutch, comprising:
a counter-pressure plate;
a clutch plate;
a contact plate movable to a limited extent in axial direction and configured to clamp the clutch plate frictionally between the contact plate and the counter-pressure plate;
a lever element configured to displace the contact plate in axial direction; and,
an actuating device operatively engaged to the lever element, the actuating device comprising:
a stator device;
a rotor device configured to rotate with respect to the stator device;
a push-pull device having at least one pull element and at least one push element securable to one another, the lever element axially arranged between the at least one pull element and the at least one push element, the lever element extending radially inward beyond the at least one pull element and the at least one push element, the push-pull device configured to exert tensile and thrust forces on the lever element; and,
a carriage device operatively engaged to the push-pull device and movable to a limited extent in axial direction with respect to the rotor device, the carriage device configured to supply tensile and thrust forces to the push-pull device.

* * * * *